United States Patent
Stibbard

(10) Patent No.: US 6,568,523 B2
(45) Date of Patent: May 27, 2003

(54) AUTOMATIC INFEED APPARATUS FOR A WOODWORKING MACHINE

(76) Inventor: James Spenser Stibbard, Box 2387, High Prairie, Alberta (CA), T0G 1E0

(*) Notice: Subject to any disclaimer, the term of this patent is extended or adjusted under 35 U.S.C. 154(b) by 4 days.

(21) Appl. No.: 09/866,962

(22) Filed: May 30, 2001

(65) Prior Publication Data

US 2002/0189980 A1 Dec. 19, 2002

(51) Int. Cl.[7] ............................................. B65G 47/14
(52) U.S. Cl. ........................ 198/396; 198/406; 198/400
(58) Field of Search ............................ 198/396, 397.01, 198/400, 401, 406, 416, 836.2

(56) References Cited

U.S. PATENT DOCUMENTS

| | | | |
|---|---|---|---|
| 3,250,372 A | * 5/1966 | Wagner et al. | 198/396 |
| 3,590,974 A | * 7/1971 | Loveless | 198/396 X |
| 3,771,641 A | * 11/1973 | Jonsson et al. | 198/396 |
| 3,774,753 A | * 11/1973 | Jones, Jr. | 198/396 |
| 4,039,108 A | 8/1977 | Hahn et al. | 226/171 |
| 4,246,943 A | 1/1981 | Cromeens | 144/245 |
| 4,429,784 A | 2/1984 | Cromeens | 198/744 |
| 5,617,910 A | 4/1997 | Hill | 144/356 |
| 6,189,682 B1 | 2/2001 | Hill | 198/718 |

* cited by examiner

*Primary Examiner*—James R. Bidwell

(57) ABSTRACT

The invention is an automatic, unmanned, powered, variable speed finger joint machine infeed apparatus which receives a random and haphazard delivery of blocks from a controllable supply conveyor. An intermittently operable infeed conveyor moves blocks from the supply conveyor to an unscrambler, through which a slat chain travels and picks up blocks. The slat chain is composed of two chain loops, connected at regular, equal intervals by slats. The unscrambler partially singularizes and orientates blocks transversely to the direction of travel and the slat chain pushes blocks over an even ending conveyor which aligns them to the inside of one of the chains. The slat chain pushes the even ended blocks under a block hold down, which allows excess blocks to drop out of the system, and then over a moisture detecting system. Blocks containing unacceptable moisture fall through a gap in the working table while blocks with acceptable moisture are pushed by the slats over a door covering the gap and onto an outfeed table. The slats are synchronized to the lugs on the finger joint machine's lug chain and deposit correctly aligned and orientated blocks precisely on the lug chain. The slat chain then rotates upward and loops back over the working table and then down, under the infeed conveyor to re-emerge at the unscrambler.

16 Claims, 6 Drawing Sheets

DIRECTION OF TRAVEL

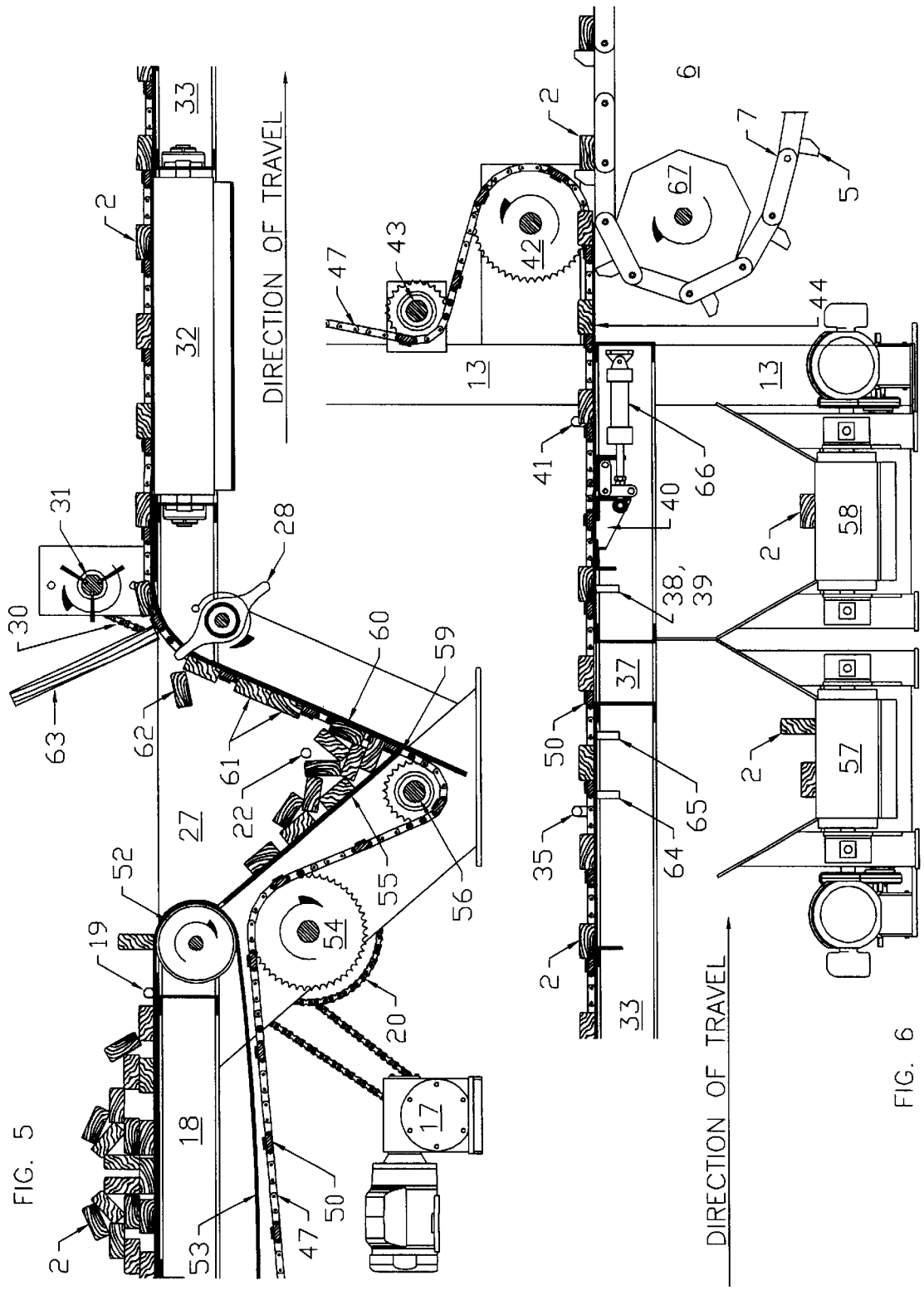

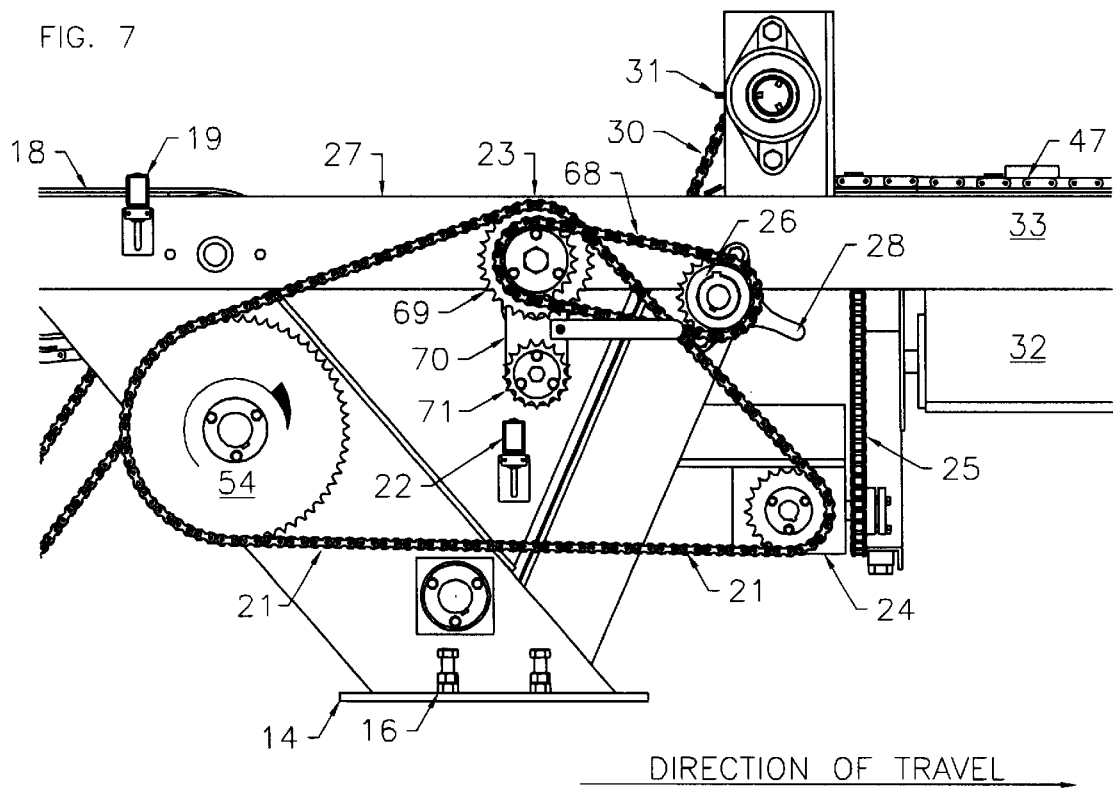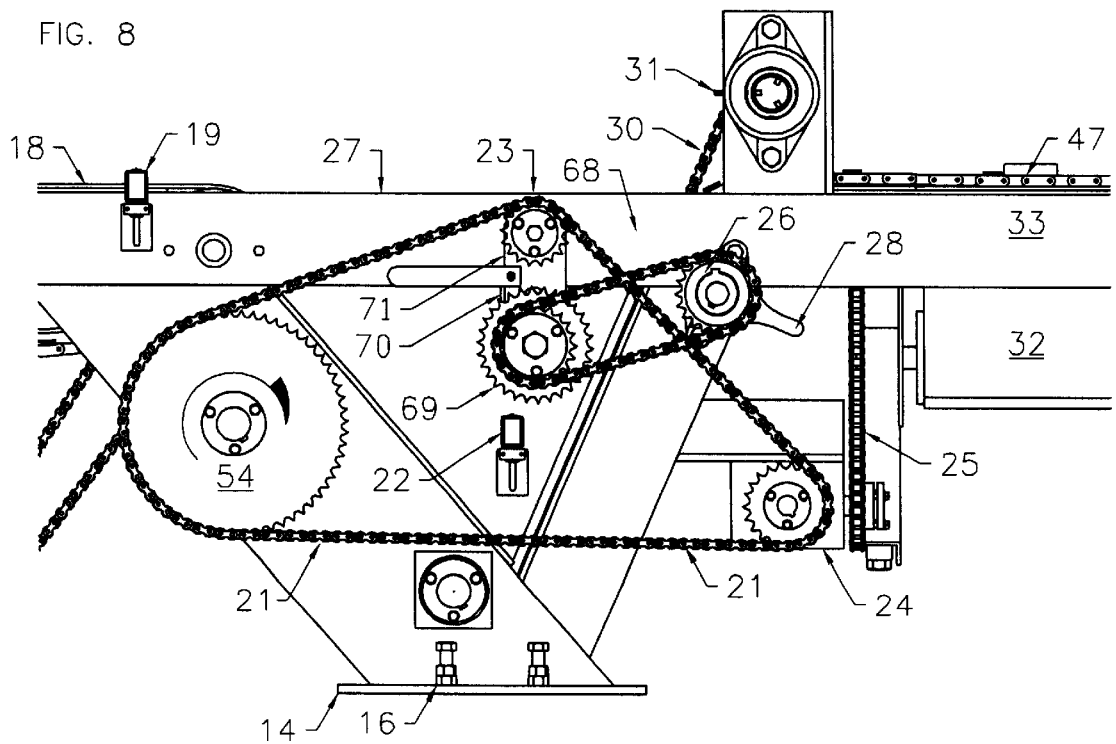

AUTOMATIC INFEED APPARATUS FOR A WOODWORKING MACHINE

| Inventor | Stibbard; James S. |
|---|---|
| Citizenship | Canadian |
| Address | Box 2387, High Prairie, Alberta, Canada T0G 1E0 |
| Telephone | 780-523-3182 |
| Email | stibbard@telusplanet.net |
| Assignee | Stibbard; James S. (High Prairie, Alberta) |

REFERENCES CITED

| 6,189,682 | Feb. 20, 2001 | Hill | 198/718 |
|---|---|---|---|
| 5,617,910 | Apr. 8, 1997 | Hill | 144/356 |
| 4,429,784 | Feb. 7, 1984 | Cromeens | 198/744 |
| 4,246,943 | Jan. 27, 1981 | Cromeens | 144/245 |
| 4,039,108 | Aug. 2, 1977 | Hahn et al. | 226/171 |

FEDERALLY SPONSORED RESEARCH OR DEVELOPMENT

Not Applicable

MICROFICHE APPENDIX

Not Applicable

BACKGROUND OF THE INVENTION

Finger jointing machines are used to mill joints in the ends of random lengths of lumber, hereafter referred to as "blocks". Glue is applied to the joints and the blocks are pressed together to form longer pieces of lumber. This is an oversimplification of a precise, complicated process known as finger jointing, but the focus of this invention is the accurate feeding of finger joint machines with blocks, not the process of finger jointing blocks.

This invention relates generally to an apparatus that requires no human operator and that accepts a random and haphazard delivery of blocks from a supply conveying means, ensures that every block has an acceptable moisture content and delivers a consistent, correctly aligned and correctly orientated supply of blocks at precise intervals to the finger joint machine's lug or slat chain at any lineal speed that is determined by that finger joint machine.

This invention applies to finger joint machines which use either a chain with lugs spaced at regular intervals thereon or a plurality of chains connected by slats at regular intervals to push a block through the said machine's shaper head or heads. The former type of finger joint machine is referred to as a lug chain finger joint machine and the latter is known as a slat chain finger joint machine. The phrase "lug chain" includes the "finger joint lug chain" and the "finger joint slat chain", but the phrase "finger joint slat chain" may be used herein when necessary. Lugs or slats attached to the lug chain are referred to as "lugs" herein, ignoring the difference between a lug and a slat. The means to supply either type of finger jointing machine with raw material is known as a lug loader by those knowledgeable in the art. Placing a block ahead of a lug is referred to as placing a block "on lug" herein. For clarity, the longitudinal left hand end of any apparatus is defined herein as the infeed, where blocks are deposited to be eventually fed to the finger joint machine. The right hand end of the same apparatus is defined as the outfeed where blocks are deposited on the finger joint machine. The direction of travel is assumed herein to be from left to right and upstream refers toward the infeed and downstream refers toward the outfeed. The words "sprocket" and "chain" may sometimes refer to a multiplicity of sprockets and/or chains, but the singular is generally used.

Historically, finger joint machines were supplied with blocks manually. FIG. 1 illustrates the steps required to place blocks on a lug chain manually. A supply means 1 deposits blocks 2 on an accumulation table 4, where a person 3 picks up a block 2, aligns and places it on the finger joint machine's 6 lug chain 7. Human dexterity became incapable of placing a block in each lug 5 of the lug chain 7 as lug speed and operating speed increased. Empty lugs represent lost production, increased costs and less profit. Workers also suffer injuries while placing blocks manually on lug, thereby increasing production costs with production down time, employee sick leave, various forms of compensation, new operator training and rehabilitation of the injured worker.

Mechanical lug loaders were invented to supplement or replace manual lug loading and work with varying degrees of success. Some individuals, such as Hill, U.S. Pat. No. 6,189,682, U.S. Pat. No. 5,617,910, Cromeen, U.S. Pat. No. 4,429,784, U.S. Pat. No. 4,246,943, Hahn et al., U.S. Pat. No. 4,039,108, and others, were awarded patents for their inventions. Others put their inventions to work in their own manufacturing operations without patent protection.

Lug loaders have generally comprised four separate means to accomplish the task of placing blocks on lug: a supply means, a powered accumulation means, a control means and a powered transfer means.

FIG. 2 illustrates the steps required to load a finger joint machine's lug chain 7 with blocks 2 using a prior art lug loader (sensors and electronic means required to control the prior art lug loader have not been shown).

A supply means 1, which may be a vibrating conveyor, belt conveyor, or some other means, deposits blocks 2 in a haphazard and random fashion on an accumulation means 9, where a person 3 manually picks up a block 2, orientates it in a side-by-side, parallel manner with other blocks 2 with its widest face down and one of its ends aligned to a fence 8, which represents a datum line that continues to the finger joint machine's own fence. A fence 8 may be understood as an obstruction that runs longitudinally along one side of the accumulation means 9 from its infeed to its outfeed in a more or less straight line. Workers must ensure that blocks 2 always maintain contact with the fence 8 and that blocks 2 remain at right angles to the fence 8, because block ends may not be milled correctly by the finger joint machine 6, if they are placed on the lug chain 7 at some distance from the fence 8.

The block is then moved under the powered brush hold down 12 on the accumulation means 9 and is pushed in the direction of travel until it is stopped at the control means 10. The control means 10 releases blocks 2 onto the transfer means 11 at intervals synchronized with the lugs 5. Synchronization may be achieved by electrical or mechanical means and various means, such as levers or pinch rolls employing pressure cylinder means, are used to release blocks from the accumulation means 9 to the transfer means 11.

The transfer means 11, that bridges the gap between the accumulation means 10 and the lug chain 7, is often comprised of two features: a form of table that blocks lie on and an overhead conveying means. The table generally has a low coefficient of friction and may be comprised of sheet metal, skate wheels, or synthetic materials such as UHMW, which encourage the overhead conveying means 12 to push the block 2 across the transfer table 11 smoothly. The overhead conveying means 12, which may be comprised of a powered brush hold down or a powered, narrow polyethylene belt conveyor, applies pressure against the block 2 and pushes it across the transfer table 11. Overhead conveying means 12 usually require precise adjustment for block thickness to work satisfactorily, otherwise malfunctions may occur.

The transfer means 11, assisted by the powered brush hold down 12, deposits the blocks 2 on the lug chain 7.

Problems often occur when block lengths vary significantly, for example 5½ " to 55", because the longer length blocks tend to push around the shorter blocks on the accumulation table and under the powered hold down. Problems also occur on the transfer table because one end of a block is controlled better than the other. In each case, this causes one end of the block to lag behind the other, which may cause the block to move away from the right angled orientation required by the finger joint machine. Various means, such as powered hold down brushes, have been developed to remedy this problem, with limited success, and manual intervention is usually required to ensure satisfactory block alignment for the control means.

A finger joint machine may tolerate some poor orientation and misalignment, but mismanufacture and/or damage may occur if blocks become seriously disturbed, especially if a block jams between the finger joint machine's lugs.

Lug loading means do not normally include a means to determine block moisture content and a means to process those blocks with unacceptable moisture content. Block moisture content is critical to the glueing and glue curing process of finger joint lumber manufacturing, because incorrect block moisture content may cause glue line failure and the rejection of a manufacturing shift's total production output.

The invention differs from prior art significantly and represents a complete finger joint machine infeed system. It does not require manual labor and does not use a conventional accumulation, control, or transfer means, but it can receive blocks in a haphazard and random fashion from a supply means, orientate and align the blocks accurately, reject blocks with unacceptable moisture content and deposit blocks at precise and controlled intervals on the lug chain, regardless of block length variance, and at any lineal speed that the lug chain may run at.

BRIEF SUMMARY OF THE INVENTION

Various means have been invented to supply finger joint machines with an automatic, continuous supply of random length blocks. Hill, U.S. Pat. Nos. 6,189,682 and 5,617,910, Cromeens, U.S. Pat. Nos. 4,429,784 and 3,927,705, and Hahn et al., U.S. Pat. No. 4,039,108, each describe a method to feed blocks to finger joint machines and these means are known to persons knowledgeable in the art.

This invention is a novel and ingenious departure from the prior art and comprises an unmanned, automatic finger joint machine infeed means, complete with a means to receive random length blocks from a supply means; a means to orientate, singularize and align the blocks, a means to detect the moisture content of each block and reject that block if necessary, and a means to dispense blocks to the lug chain at precisely defined intervals. The invention will operate throughout the lug chain's lineal speed range, specifically full stop to full speed, without adjustment or interruption and performs this continuously, automatically and accurately and does not require manual labor.

The invention will process variable width, thickness and length blocks, but blocks of similar width and thickness should be processed together. The preferred embodiment of the invention is one that will process blocks ranging in width from 2½" to 7¼", thickness ranging from ⅝" to 2¼" and lengths ranging from 5½" to 55", although the invention may process additional block dimensions.

The invention is comprised of six interdependent areas: the infeed conveyor, the unscrambler, the even ending conveyor, the excess block drop out gap, the moisture sensing area and the outfeed plate. A novel slat chain links all, but the infeed conveyor, together.

The infeed conveyor is furnished with blocks in a random and haphazard fashion by a supply conveying means and then deposits these blocks in the unscrambler. The preferred embodiment of this invention includes an infeed conveyor, but this may be omitted if required, as described below, in which case the supply conveyor deposits blocks directly into the unscrambler. The supply conveyor is not the preferred method of feeding the unscrambler with blocks, because this causes more severe block tumbling and churning within the unscrambler.

The slat chain moves upward through the unscrambler and its slats pick up individual blocks which are partially singularized and orientated at right angles to the direction of travel within the unscrambler. The slats push blocks across the even ending conveyor, which moves blocks transversely to contact the inside edge of one of the slat chains. This particular side of the slat chain is aligned with the finger joint machine's fence, thereby ensuring that block ends are longitudinally aligned to the finger joint machine's fence.

Blocks are then pushed across a short, flat table by the slats and under a block hold, which prevents the unsecured end of the block from dipping. If a block is not pinched by the hold down, it drops through a gap in the table and is returned to the supply conveying means by other conveying means. The slats then push blocks across a moisture detecting means. Any blocks with unacceptable moisture fall through a gap, which is created when the moisture detecting means causes a door to open, onto a conveying means which removes them to another area. Blocks with acceptable moisture are pushed across the said door onto an outfeed plate.

The preferred embodiment of this invention includes a block moisture detecting means, a gap through which blocks with unacceptable moisture content fall, a door to cover the said gap and a control means to operate the said door. However, the moisture detecting means and its associated elements may be omitted.

Contrary to other lug loaders and unscramblers, whose conveying means move downward to loop back to the infeed, the slats push blocks across the outfeed plate and then move upward away from the outfeed plate to eventually loop back under the infeed conveyor, if it is present, to the unscrambler, thereby allowing a flat, unbroken outfeed table that lies just above the lug chain. This ensures that slats deposits blocks at the end of the outfeed table in the same, precise location.

Blocks maintain continuous contact along their length with the slats and one end always contacts the slat chain. This eliminates all the problems caused by block lengths encountered by other lug loaders. The slat chain controls each block, from the unscrambler to the finger joint machine, and prevents incorrectly aligned blocks, thereby ensuring correct lateral alignment to the finger joint machine.

The slats are synchronized to the lugs, therefore every block, regardless of its width or length, is always deposited on the lug chain in the same orientation, alignment and precise location and at any lineal speed determined by the lug chain.

In summary, the invention accepts a random and haphazard delivery of blocks from a supply conveyor, ensures that every block has an acceptable moisture content and delivers a consistent, correctly aligned and correctly orientated supply of blocks at precise intervals to the lug chain at any speed determined by the finger joint machine. This is performed automatically without human intervention.

BRIEF DESCRIPTION OF THE SEVERAL VIEWS OF THE DRAWING

FIG. 5 shows an enlarged sectional view of the unscrambler.

FIG. 6 is an enlarged sectional view of the moisture detecting sensors, unacceptable moisture drop out door and the outfeed plate.

FIG. 7. illustrates the switch gear means in the "ON" position.

FIG. 8. illustrates the switch gear means in the "OFF" position.

DETAILED DESCRIPTION OF THE INVENTION

Finger joint machines may be referred to as right hand or left hand machines. A right hand machine is one that has the closest machining means on the right hand side of the finger joint machine, if one stands at the infeed end of the finger joint machine and looks toward its outfeed end. All drawings associated with this invention show a machine feeding a right hand finger joint machine, but it is understood that a mirror image of the invention may also feed a left hand finger joint machine.

Figure 1:
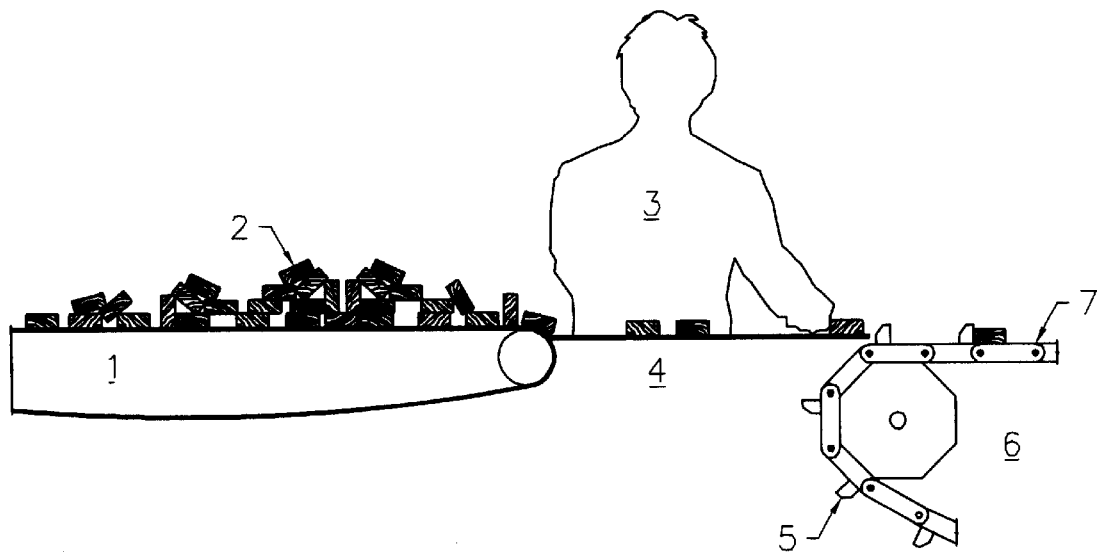
FIG. 1 illustrates the steps required to load a processing machine with blocks manually.
Figure 2:
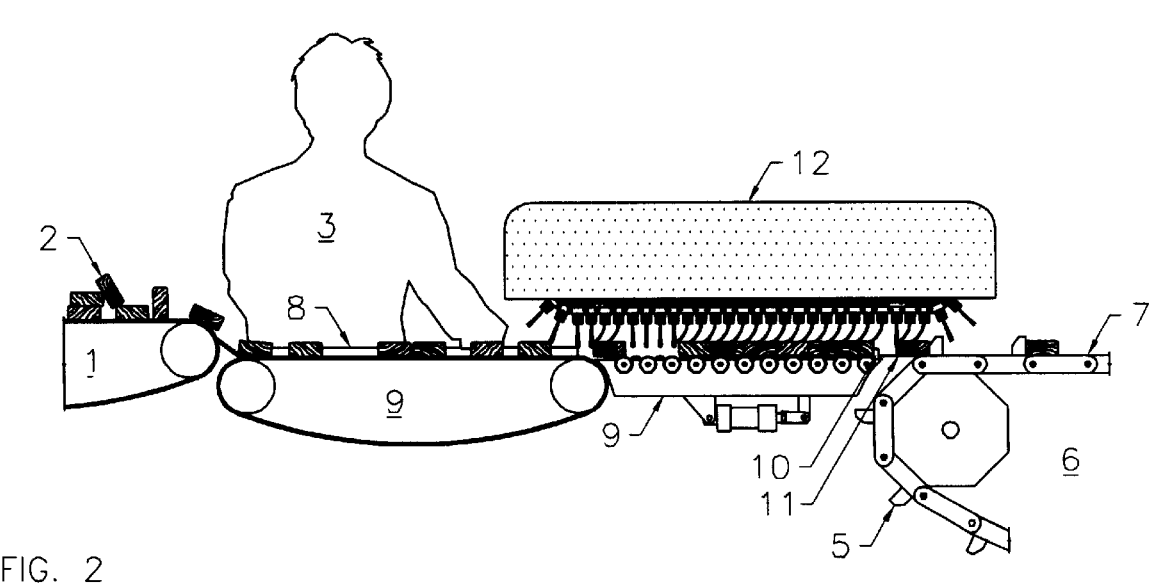
FIG. 2 shows the steps required to load a processing machine with blocks using a prior art lug loader.
Figure 3:
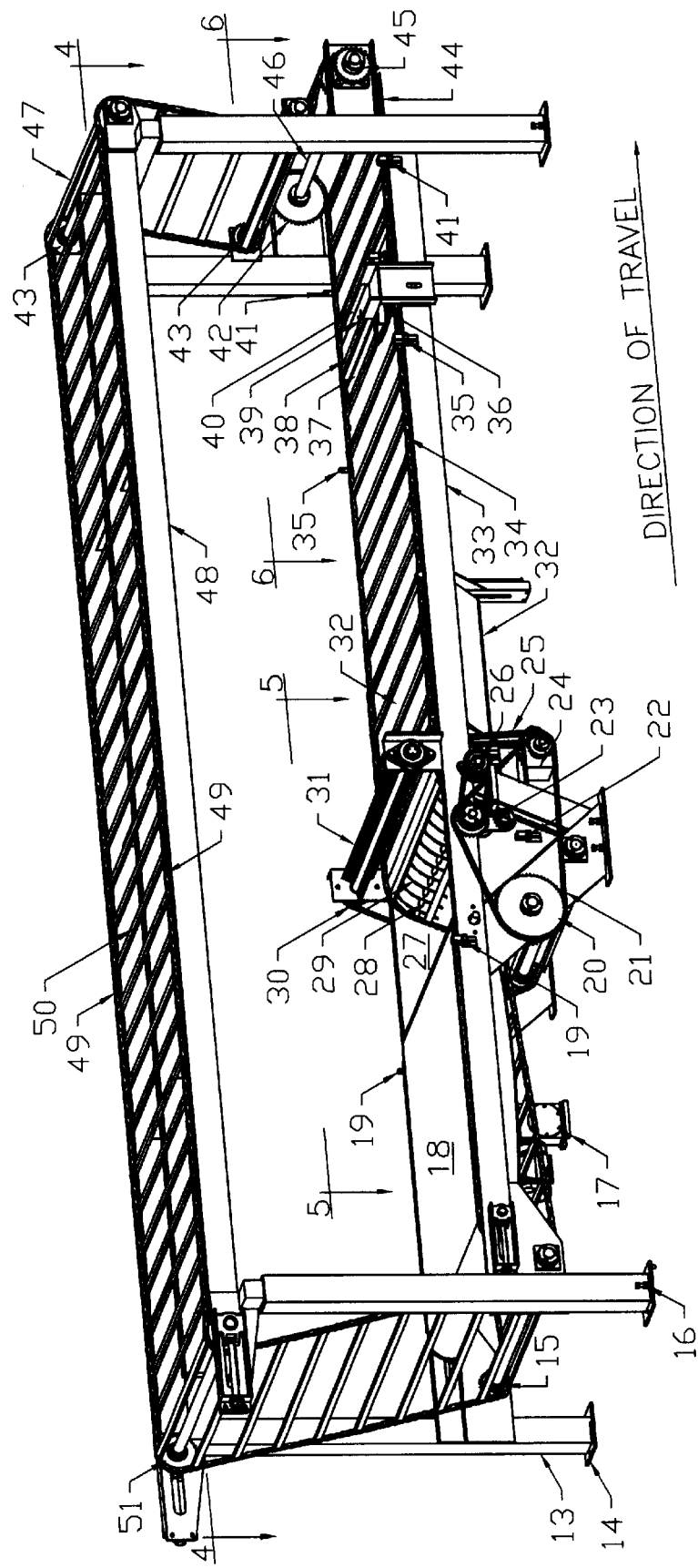
FIG. 3 is a perspective view of the invention and defines three sectional views.
Figure 4:
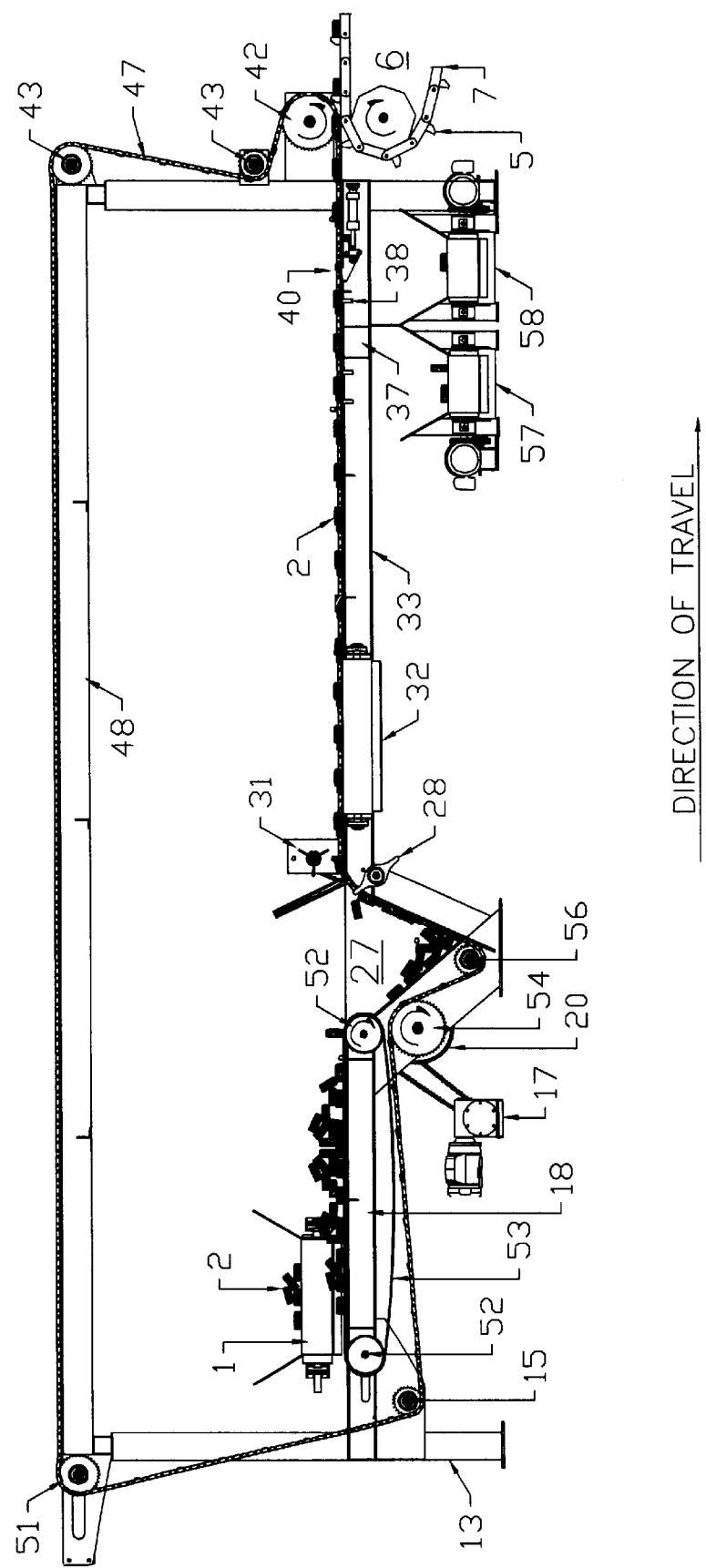
FIG. 4 is a section through the invention and shows how blocks are received from the supply conveyor and processed through the invention.

Four columns 13 support a working table 33, at a comfortable manual working height above floor level, for example 34 inches, and an upper frame which supports the slat chain carrier 48 above the working table 33. This is illustrated in FIG. 3 and FIG. 4. The working table 33 is comprised of an infeed conveyor 18, an unscrambler 27, an even ending conveyor 32, an excess block drop out gap 37, one or more moisture detecting means 39, a door 40 covering a gap through which blocks having unacceptable moisture drop, and an outfeed plate 44.

The preferred embodiment of this invention includes an infeed conveyor 18, but this may be omitted, as described below.

Each column 13 is fitted with a footplate 14 comprising a plate and a height adjustment means 16 (FIGS. 3, 7, 8, 9, 10), which allows precise vertical adjustment of the invention relative to the finger joint machine 6 (FIG. 4). It is understood that fine height adjustments may be accomplished by many means, such as jacking bolts, shims, spacers, grouting and other means familiar to persons knowledgeable in the art.

A slat chain 47 is threaded through the invention, as shown in FIG. 4. The slat chain 47 overlays the even ending conveyor 32 (FIGS. 3, 4, 5, 9), passes underneath the block hold down 36 (FIGS. 3, 9), over the moisture detecting means 39 (FIGS. 3, 6), over the door 40 (FIGS. 3, 4, 6), that covers the unacceptable moisture drop out gap, and the outfeed plate 44 (FIGS. 3, 6) and then loops upward around the drive sprockets 42 (FIGS. 3, 4, 6), around the outfeed end's idler sprockets 43 (FIGS. 3, 4, 6), around the upper idler sprockets 43 (FIGS. 3, 4), horizontally back towards the infeed end over the slat chain carrier 47 (FIGS. 3, 4) attached to the upper frame and around the rear upper idler sprockets 51 (FIGS. 4, 5), down and around the rear idler sprockets 15 (FIGS. 4, 5), forward, underneath the infeed conveyor 18 (FIGS. 4, 5), if it is present, toward the infeed end and around the unscrambler driven sprockets 20 (FIGS. 4, 5) down and around the unscrambler idler sprockets 56 (FIGS. 4, 5) to emerge through a slot 59 (FIG. 5) in the bottom of the unscrambler 27 (FIGS. 3, 4, 5)) to climb up the unscrambler's uphill plate 60 (FIG. 5) to complete the slat chain's 47 endless loop at the even ending conveyor 32 (FIGS. 3, 4, 5).

Figure 10:
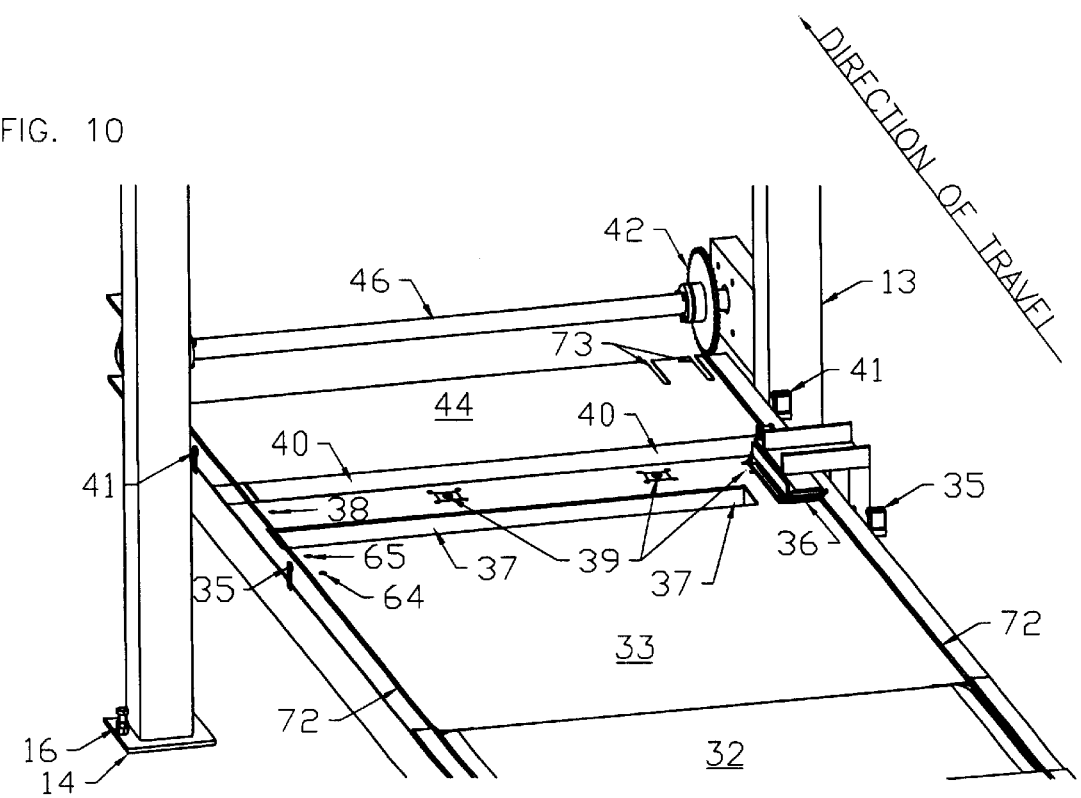
FIG. 10 shows the same perspective view as FIG. 9, but the displayed blocks and slat chain have been omitted to illustrate the underlying structure.

The slat chain 47 is comprised of two strands of chain 49 which are connected in two endless loops (FIG. 3). The preferred embodiment of this chain is an extended pitch chain, but other suitable chains or belts may be substituted. Slats 50 connect both chains 49 at regular intervals, which may mimic the finger joint machine's lug intervals, for example 6, 9 or 12 inch spacing The result is that the slat chain 47 resembles a continuous, wide, flexible ladder. The slat chain 47 is guided by wear strips 72 (FIG. 10) attached longitudinally, in the direction of travel, to both sides of the unscrambler's uphill plate 60 and running to the end of the outfeed plate 44 (FIGS. 3, 4, 6, 10) and attached to the upper chain carrier 48 (FIGS. 3, 4). FIG. 10 illustrates the positioning of the wear strips 72 on the working table 33. The preferred embodiment of slats 50 is steel tubing or steel bar stock although other material such as wood or plastic may be substituted The preferred embodiment of all wear strips employed by this invention is a synthetic material such as UHMW, but steel may also be used.

The slat chain 47 is driven by sprockets 42 which are rotated by the drive shaft 46 (FIG. 3). The slats 50 must be exactly synchronized with the lugs 5, so that a slat 50 on the slat chain 47 and a lug 5 on the lug chain 7 arrive consistently in precise juxtaposition at the invention's outfeed, as shown in FIG. 6. If synchronization between slats 50 and lugs 5 is maintained, objects placed ahead of the slats 50 must be deposited on the lug chain 7 correctly in relation to the lugs 5. Therefore, the preferred embodiment of a means to rotate the drive shaft 46 (FIG. 3) is a driven sprocket 45 (FIG. 3) linked by a sprocket and roller chain means to the drive shaft or tail shaft of the finger jointer's lug chain, which ensures a strict mechanical linkage between the slat chain and the lug chain. This has not been illustrated in the drawings because the means to link sprockets with chain is well understood by persons skilled in the art.

Other means are permissible to drive the slat chain 47, if an exact and precise correlation between the slats 50 and the lugs 5 is maintained throughout the lug chain's 7 entire lineal speed range (FIG. 6).

The infeed conveyor 18 is furnished with blocks 2 by an electronically controlled supply conveyor 1, which delivers blocks 2 in a random and haphazard fashion, as demonstrated in FIG. 4. The supply conveyor 1 is not regarded as part of this invention and may be a generic belt conveyor, vibrating conveyor, or any other electronically controllable supply means. The preferred embodiment of the infeed conveyor 18 is a conventional belt conveyor, comprising an endless belt 53, two rollers 52, and an electric motor and reducer drive means 17 (FIG. 4). Any electronically controllable conveying means, that can receive blocks at right angles to the direction of travel and move the same blocks to the unscrambler, is acceptable.

The preferred embodiment of this invention includes an infeed conveyor 18, but this may be omitted, as described below, in which case the supply conveyor 1 deposits blocks 2 directly into the unscrambler 27 (FIG. 4). The supply conveyor is not the preferred method of feeding the unscrambler with blocks, because this causes more severe block tumbling and churning within the unscrambler.

Blocks 2 fall off the end of the infeed conveyor 18 into the unscrambler 27 and slide down its down hill plate 55 toward the bottom of the unscrambler 27 (FIGS. 4, 5).

The motion of the infeed conveyor 18 and the supply conveyor 1 is controlled by the infeed conveyor's block sensing means 19, located at the outfeed end of the infeed conveyor 18 (FIGS. 3, 5, 7, 8). The infeed conveyor's block sensing means 19 will electronically stop the drive means 17 of the infeed conveyor 18 and the supply conveyor 1 if it senses a block 2, but it will not operate until it is enabled by a block sensing means 22 located in the unscrambler 27 (FIGS. 3, 5). The unscrambler block sensing means 22 will enable the infeed conveyor's block sensing means 19, if it is senses a block for a predetermined time period. This prevents an overfilled condition occurring in the unscrambler 27. It is important that the unscrambler is not overfilled, because the unscrambler is designed to work efficiently with a small number of blocks within the bin to minimize the tumbling or churning action of blocks.

If the infeed conveyor's block sensing means 19 is enabled, the infeed conveyor 18 and the supply conveyor 1 (FIG. 4) will continue to move until the infeed conveyor's block sensing means 19 senses a block (FIGS. 4, 5). This ensures that the infeed conveyor 18 does not run out of blocks 2 and that a block is immediately available to the unscrambler 27 when the unscrambler's block sensing means 22 no longer senses a block 2, thereby disabling the infeed conveyor's block sensing means 19 and allowing the supply conveyor 1 and infeed conveyor 18 to move again (FIG. 4). If the infeed conveyor 18 is omitted, the supply conveyor's 1 motion is controlled by the unscrambler's block sensing means 22.

The preferred embodiment of the infeed conveyor's block sensing means 19 and the unscrambler's block sensing means 22 is a beam interruption photo sensor, but reflected light photo sensors or mechanical switches could also be used.

Unscramblers have been employed in the lumber manufacturing industry for many years. Their function is to receive surges of lumber from a supply means and to orientate this lumber and meter it to an outfeed conveying means in an organized fashion. The following suggests a brief, general description of unscramblers.

Unscramblers, as demonstrated in FIG. 5, are comprised of a downhill plate 55 and an uphill plate 60, and two or more chains 47 with attached lugs or slats 50. Slats 50 or lugs move upward through a slot 59 in the bottom of the unscrambler, pick up blocks 2 and carry them up the uphill plate 60 to be deposited on an outfeed conveyor. Slats or lugs are used on the chain, depending on the manufacturer's requirements. Unscrambler chains usually form short, closed loops which rotate over sprockets located at the top and bottom of the unscrambler's uphill plate. Sometimes, the lower sprocket is eliminated in favor of a curved channel. Unscramblers are usually driven intermittently through their top sprocket assembly by a dedicated electric or hydraulic motor.

The invention's unscrambler 27, shown in FIGS. 3, 4 5, 7 and 8, differs from prior art unscramblers in three ways. Firstly, the slat chain 47, which picks up blocks 2 and climbs the face of the invention's unscrambler's uphill plate 60, does not loop down behind the said uphill plate 60 to form a short chain. Instead, it describes a wide path around the invention and above and over the uphill plate 60 to form a long loop chain, as illustrated in FIG. 4. Secondly, the invention's unscrambler 27 does not have its own, independent motive power: the slat chain 47 is moved by the invention's head sprockets 42 and head shaft 46 which are interlocked with the finger joint machine's lug chain 7 so that the slat chain 47 moves whenever the lug chain 7 moves. Thirdly, the slat chain 47 is intrinsic to the whole invention, including the unscrambler 27: the slat chain 47 functions within the unscrambler 27, on the even ending conveyor 32, over the excess block drop out gap 37, over the moisture detecting sensing means 39, over the door 40 that closes the unacceptable moisture drop out gap, and on the outfeed plate 44 to deliver blocks 2 to the lug chain 7 as shown in FIG. 4 and FIG. 6.

The slat chain 47 moves through a slot 59 in the bottom of the invention's unscrambler 27 and upwards against the unscrambler's uphill plate 60, as illustrated in FIG. 5. Blocks 2 are agitated by this upward movement and fall so that their widest faces lie against the unscrambler's uphill plate 60. Slats 50 contact the narrow faces of block's 2 and carry the blocks 2 up the uphill plate 60, meanwhile the infeed conveyor 18 replenishes the supply of blocks 2. The infeed conveyor 18 will not replenish the block supply if the block sensing means 22 has detected a block 2 for a predetermined time interval, as detailed above. When the block sensing means 22 no longer detects a block 2, the infeed conveyor 18 will replenish the supply of blocks.

Multiple blocks 2 may be picked up by one slat 50, horizontally and vertically (FIG. 5). For example, two or more blocks 2 may lie horizontally with their narrow faces against the slat 50 and their wide faces against the uphill plate 60. Similarly, the spacing between the slats 2 on the slat chain 47 may be large enough that two or more block widths may be accommodated vertically. In this instance, both block's wide faces lie against the unscrambler's uphill plate 60, but only one block's narrow face lies against the slat 50. The other block lies above the former block with its narrow face contacting the former blocks' narrow face. FIG. 5 shows two blocks 61 in this configuration. Finally, the slats 50 may pick up blocks 2 in a vertical orientation so that a block's end rests against a slat 50 or another block. If the block 2 is short, its wide face may lie against the unscrambler's uphill plate 60, otherwise it may lie against the preceding slat 50 or carried block 2. FIG. 5 illustrates a vertically aligned block 63 that has just been pushed off a slat.

None of the above conditions are desirable, because they disturb the orderly orientation of blocks.

Multiple horizontal blocks are allowed to proceed up the unscrambler's uphill plate 60, out of the unscrambler 27 and over the even ending conveyor 32 to the excess block drop out 37 (FIG. 4). This will be described in detail below.

Multiple blocks 61 are eliminated by a singularizer 28 located adjacent to the uphill plate 60, as shown in FIG. 5. The singularizer 28 is comprised of multiple arms attached to a shaft, supported by bearings and rotated by a driven sprocket 26 (FIGS. 3, 7, 8) attached to the said shaft. The driven sprocket 26 is driven by the unscrambler drive sprocket 54 through a switch gear means 23 (FIGS. 3,7, 8) and the singularizer arms 28 rotate through slots 29 (FIG. 3) located in the uphill plate 60 and thereby push blocks 62 off the slat 50, as demonstrated in FIG. 5.

The singularizer 28 must be disabled, if the spacing between slats 50 can only accommodate one block width, otherwise all blocks 2 will be pushed off the uphill plate 60. The switch gear means 23 is employed to enable or disable the singularizer 28. This is illustrated in FIG. 7 and FIG. 8. The switch gear means 23 is comprised of a double single sprocket 69 and an idler sprocket 71 mounted on a plate 70 that is rotatable on a shaft. A chain 68 encircles one of the double single sprocket's sprockets 69 and the singularizer's driven sprocket 26. The switch gear means 23 is designed so that either the other sprocket of the double single sprocket 69 or the idler sprocket 71 will be in contact with the drive chain 21 when the plate 70 is rotated 180 degrees. When the switch gear means 23 is rotated to the singularizer "ON" position, as demonstrated in FIG. 7, the double single sprocket 69 contacts and is rotated by the drive chain 21 and therefore causes the singularizer 28 to rotate. Conversely, the singularizer 28 cannot rotate when the switch gear 23 is rotated to the singularizer "OFF" position because the idler sprocket 71 contacts the drive chain 21, as shown in FIG. 8.

The rotation and extension of the singularizer arms 28 through the unscrambler's uphill plate 60 is synchronized with the movement of the slats 50 up the said uphill plate 60 and will operate precisely throughout the slat chain's 47 lineal speed range (FIG. 5).

It is understood that a variety of singularizers exist within the art. Some use pressure cylinder means to push blocks off the uphill plate, others use levers and others use rotating arms. The means are not critical but all have one thing in common: the singularizer must be timed to push blocks off the unscrambler's uphill plate at a precise moment in relation to the unscrambler's chain lugs or slats. The preferred embodiment of a singularizer is the above rotating arm singularizer, but any singularizer means is acceptable and it is therefore understood that other singularizer means may replace the rotating arm singularizer. Similarly, the switch gear means 23 may be replaced by other means, if the rotating arm singularizer is employed, or eliminated entirely using other singularizer means.

Vertically misaligned blocks 63 are pushed off the slats 50 by a rotating paddle means 31 mounted on two brackets located adjacent to the unscrambler's uphill plate 60. This is illustrated in FIG. 5. The said paddle 31 may be comprised of any suitable flexible material, but a brush is the preferred embodiment thereof It is critical that the material does not allow vertical blocks to jam between the material and the slat 50. The rotating paddle 31 is rotated by a sprocket and chain means connected to a second unscrambler drive sprocket 54. This represents the preferred drive embodiment, but it is understood that other drive means such as an independent hydraulic or electric motor could be substituted.

The unscrambler 27 does not employ a sprocket and shaft means to guide the slat chain 47 over the top of the uphill plate, because the slat chain 47 is comprised of roller chain whose rollers move against the slat chain wear strips 72 (FIG. 10) and thus reduce friction. This represents the preferred embodiment, although a sprocket and shaft means could be substituted at the top of the unscrambler's uphill plate.

Slats 50 pick up blocks 2 from the unscrambler 27, carry them up the uphill plate 60 and push them across an even ending conveyor 32, as illustrated in FIG. 4 and FIG. 5.

Figure 9:
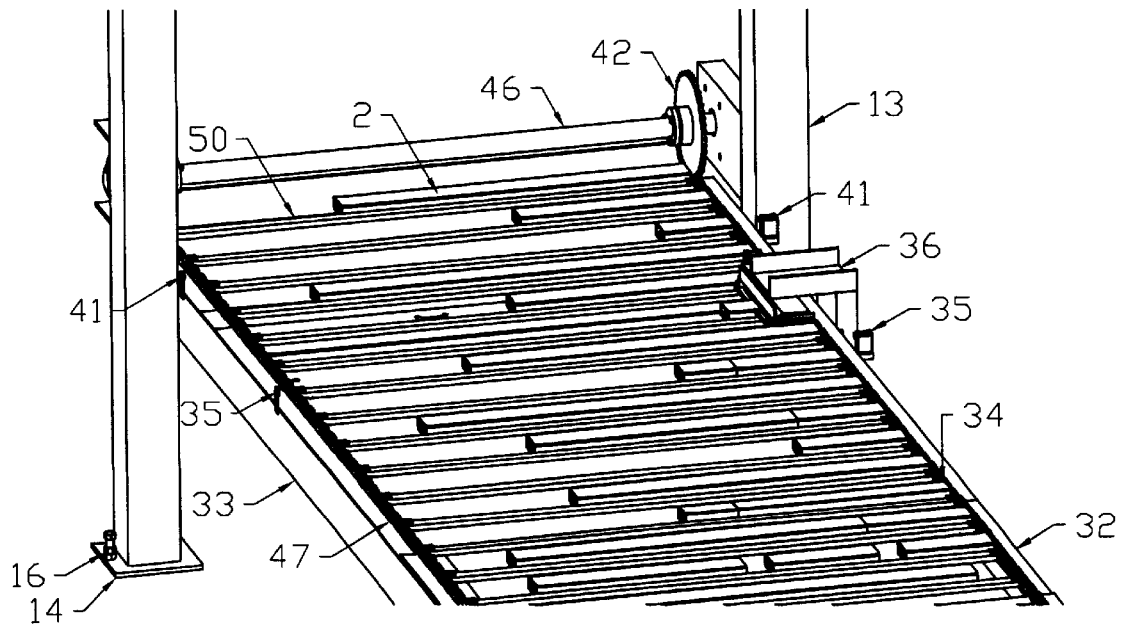
FIG. 9 is a perspective view of the invention looking from the even ending conveyor toward the outfeed plate. The slat chain idlers and some slat chain has been omitted for clarity.

The even ending conveyor 32 lies transversely between the slat chain's two chain loops 49, and is comprised of an endless belt, a plurality of rollers, shafts and bearings, whose means are well known to persons knowledgeable in the art. A belt conveyor is the preferred embodiment of the even ending conveyor although other means, such as slat chain conveyors, might also be employed. FIG. 10 shows the outfeed end of the invention in perspective, without the slat chain, slats or blocks, and demonstrates how the even ending conveyor 32 lies between the two slat chain wear strips 72 and within the working table 33. The even ending conveyor 32 generates enough friction between itself and the wide face of blocks 2 and is driven at an adequate speed to ensure that blocks 2 are moved laterally across the face of the slats 50. This motion aligns one end of the blocks 2 to a common datum or fence 34, namely the side straps of one of the chains 49 comprising the slat chain 47 as shown in FIG. 9. Multiple blocks 2 lying against the same slat 50 are moved across the slat's 50 face together by the even ending conveyor 32, leaving only one block 50 contacting the fence 34.

The even ending conveyor 32 is driven by a roller which is rotated by a driven sprocket linked by chain 25 and sprocket means to a gear box 24 (FIGS. 3, 7, 8). The gear box 24 is driven by a sprocket rotated by a chain 21 and sprocket means 23 linked to the unscrambler's drive sprocket 54. This linkage ensures that a constant lineal speed ratio is maintained between the even ending conveyor 32 and the slat chain 47, which thereby enables blocks 2 to move across the face of the slats 50 correctly.

This is the preferred embodiment of the even ending conveyor 32, but it is understood that other methods of driving the even ending conveyor belt, such as independent hydraulic and electric motors.

At this stage, the random, haphazard pile of blocks that was received by the infeed conveyor and deposited in the unscrambler has been partially singularized and orientated transversely to the direction of travel by the unscrambler and aligned to a fence by the even ending conveyor with no human intervention.

The slat 50 pushes the block 2 contacting the fence 34 across the working table 33 and underneath a block hold down 36 causing the block 2 to become pinched between the working table 33 and the block hold down 36. This is demonstrated in FIG. 9.

A block sensing means 35 is located in advance of the block hold down 36 (FIGS. 3, 6, 9, 10) and is adjusted to sense any object protruding above the blocks 2 lying on the working table 33. It will stop the invention's drive means if a protruding object is sensed, thereby preventing the protruding object moving further toward the outfeed end and eliminating the possibility of jamming and damage. The preferred embodiment of the said block sensing means 35 is a beam interruption photo sensor, but reflected light photo sensors or mechanical switches could also be used.

The block hold 36 down applies sufficient downward pressure on the uppermost wide face of the block 2 to prevent the block 2 moving out of the horizontal plane, but applies insufficient pressure to impede the movement of the block 2 in the direction of travel. The block hold down 36 can tolerate minor variations in block thickness but its vertical positioning must be adjusted if block thickness is changed significantly, for example ¾" to 1½". Normally, only same thickness blocks are processed through a finger joint machine and the finger joint machine must be adjusted to process another block thickness.

Block hold down means are well known to persons knowledgeable in the art. The preferred embodiment of a block hold down is a pneumatic hold down, which relies upon air pressure to force a flexible strip of material against the blocks, thereby holding the blocks down against the working table. Other means may employ small, powered overhead conveyors that are also held down against the block by some pressure means yet move at a similar speed to the slat chain, thereby minimizing friction between the block and the hold down. It is understood that the invention may use any block hold down means that exerts sufficient pressure on blocks to prevent the other end of the blocks depressing and catching the lip of the working table 33 on the outfeed side of the excess block drop out gap 37 as they are pushed in the direction of travel by the slats 50.

An excess block drop out gap 37 in the working table 33 is adjacent to the block hold down 36 and extends at right angles across the working table 33 and between both slat chains 47 (FIGS. 3, 4, 6, 9, 10). All blocks 2 lying against a slat 50 are pushed in the direction of travel by that slat 50 and fall through the excess block drop out gap 37, unless the block 2 is pinched between the block hold 36 down and the working table 33. The excess blocks 2 fall through the excess block drop out gap 37 onto a belt conveyor 57, which may return them to the supply conveyor 1 (FIG. 4) via a series of conveying means. The conveying means receiving the excess blocks are well known to persons skilled in the art and do not represent part of this invention. However, their presence is critical to its efficient functioning.

At this stage, the random, haphazard pile of blocks that was received by the infeed conveyor has been fully singularized, orientated transversely to the direction of travel and aligned to the fence. Blocks 2 can now be placed precisely on the lug chain 7, if block moisture content detecting is not required.

One or more moisture detecting means 39 are embedded in the working table 33 adjacent to the outfeed side of the excess block drop out gap 37 (FIGS. 3, 4, 6, 10). This is the preferred mounting position although the moisture detecting means 39 could also be mounted over the blocks 2 on some means such as an arm. The slats 50 push blocks 2 over the moisture detecting means 39 which sense the moisture content of each block 2.

Each moisture detecting means 39 may be adjusted to detect a specific moisture content, which permits a plurality of moisture detecting means 39 to sense excess moisture, insufficient moisture or a range of moisture conditions. Block moisture content is critical to the glueing and glue curing process of finger joint lumber manufacturing, because unacceptable block moisture content may cause glue line failure and the rejection of a manufacturing shift's total production output.

A slat sensing means 38 disables the moisture detecting means 39, if a slat 50 is above the moisture detecting means 39. This prevents false signals emanating from the moisture detecting means 39 (FIGS. 3, 6, 10). The preferred embodiment of all slat sensing means employed by this invention is a reflected light photo sensor, but beam interruption photo sensors or mechanical switches could also be used.

An unacceptable block moisture drop out gap is located in the working table 33 between the slat chains 47 adjacent to the outfeed side of the moisture detecting means 39. The said gap is covered by a door 40, which lies flush with the working table 33, thereby allowing slats 50 to push blocks 2 over the said gap (FIGS. 3, 4, 6). The door 40 is comprised of a plate which is opened and shut by the operation of a pressure cylinder means 66 connected to the door 40 and the invention's support structure, as shown in FIG. 6.

A pneumatic cylinder is the preferred embodiment of this pressure cylinder, but hydraulic or electric means may also be employed.

The pressure cylinder means 66 is controlled by a solenoid valve means, if it is a pneumatic or hydraulic pressure cylinder means, or a by a switching means if electric. The moisture detecting means 39 enables a slat sensing means 64, when it senses a block 2 containing unacceptable moisture. When the slat sensing means 64 senses a slat 50, it enables another slat sensing means 65 and also activates the solenoid valve or switch, which causes the door 40 to open. The slat 50 pushes the block 2 over the said gap in the direction of travel, thereby causing the block 2 to fall through the said gap onto a conveying means 58, which removes the block 2 to an area where blocks can be accumulated (FIG. 4). The slat sensing means 65 activates the solenoid valve or switch and causes the door 40 to be closed when it detects a slat 50 (FIG. 6).

The arrangement of slat sensors 38, 64, and 65, detailed in FIG. 6, allows the opening and closing of the door 40 to be adjusted precisely and represents the preferred embodiment of the door control means, although other electronic means may be employed.

The conveying means 58 (FIG. 4) receiving the unacceptable moisture content blocks is well known to persons skilled in the art and does not represent part of this invention. Its preferred embodiment is a belt conveyor and its presence is critical to the efficient functioning of the invention.

The slats 50 push blocks 2 with acceptable moisture content over the door 40 onto the outfeed plate 44, which is comprised of a material such as steel plate (FIGS. 3, 6).

The preferred embodiment of this invention includes a block moisture detecting means 39, a gap through which blocks with unacceptable moisture content fall, a door 40 to cover the said gap and a control means to operate the said door, as detailed above. However, the moisture detecting means and its associated elements may be omitted.

A block sensing means 41, located above the outfeed plate 44 and adjacent to the door 40, is adjusted to sense any object protruding above the blocks lying on the working table and will stop the invention's drive means if a protruding object is sensed (FIGS. 3, 6, 9, 10). This prevents protruding objects moving further toward the outfeed end and eliminates the possibility of jamming and damage. The preferred embodiment of the said block sensing means 41 is a beam interruption photo sensor, but reflected light photo sensors or mechanical switches could also be used.

At this stage, the random, haphazard pile of blocks that was received by the infeed conveyor has been fully singularized, orientated transversely to the direction of travel, aligned to the fence and any blocks containing an unacceptable moisture content have been dropped out of the flow of blocks.

The outfeed plate 44 is the same width as the working table 33 and extends longitudinally from the outfeed side of the door 40 to a position that is below the head shaft 46 (FIGS. 3, 6, 9, 10). It lies over a portion of the lug chain 7 at the finger joint machine's infeed, as shown in FIG. 6.

There has been no differentiation, until this juncture, between lug chain finger joint machines and slat chain finger joint machines. Therefore, the above lug chain finger joint machine's tail sprocket, shown in FIG. 4 and FIG. 6, may also be considered as a slat chain finger joint machine's tail sprocket. However, two or more slots 73 (FIG. 10) must be made in the edge of the outfeed plate 44, if the finger joint machine is a lug chain finger joint machine, which will permit the lugs 5 to rotate through the outfeed plate 44 (FIG. 6). This is not required if the finger jointer is a slat chain finger joint machine.

The invention must be precisely aligned vertically, horizontally and laterally to ensure that the outfeed plate 44 lies just above the lug chain 7 and causes no obstruction to the lug chain 7 or its lugs 5. This is illustrated in FIG. 6. Precise vertical alignment is achieved using the height adjustment means 16 (FIGS. 3, 7, 8, 9, 10). Precise lateral positioning of the invention is required: slats 50 and lugs 5 must be parallel. Similarly, the inside edge of the slat chain 47, described above as a fence 34 (FIG. 9), must be in line with the finger joint machine's fence. This ensures that blocks 2 will be correctly aligned laterally to the finger joint machine and that their ends will be milled correctly. The head shaft 46, the finger joint machine's tail spool 67 and the end of the outfeed plate 44 should be in approximate vertical alignment. This will align the invention and finger joint machine longitudinally to allow the slats 50 to deposit the blocks 2 precisely on the lug chain 7, as shown in FIG. 6.

Blocks 2 are pushed across the outfeed plate 44 by the slats 50 and are deposited precisely on the lug chain 7 as the slat chain 47 moves upward (FIGS. 4, 6). The lugs 5 rotate upwards behind each deposited block 2 and are precisely synchronized with the slats 50, as described above. The lugs 5 contact the block 2 and push the block 2 away from the invention and through the finger joint machine 6. Meanwhile, the slat chain 47 moves upward around its drive sprockets 42 and idler means 43 and over its supporting chain carriers 48, located above the working table, to loop around to the infeed end of the invention (FIGS. 3, 4).

In summary, the invention is an unmanned, automatic, variable speed infeed apparatus for a finger joint machine, which receives a random and haphazard delivery of blocks from a powered, intermittently operable supply conveyor. The supply conveyor deposits blocks on a powered, intermittently operable infeed conveyor which moves the blocks from the supply conveyor to an unscrambler. If a block sensing means detects an overfilled condition in the unscrambler, it enables another block sensing means, located on the infeed conveyor's outfeed, that stops the infeed and supply conveyors when it senses a block.

The infeed conveyor may be omitted, in which case the supply conveyor deposits blocks directly into the unscrambler and the unscrambler's block sensing means controls the supply conveyor's motion.

A slat chain moves through the unscrambler and picks up blocks. The blocks are oriented transversely to the direction of travel and partially singularized by a singularizer, if the singularizer is operational. The slat chain then pushes blocks over an even ending conveyor, which aligns the ends of blocks to the inside of the slat chain. Those blocks contacting the inside of the slat chain are pushed under a block hold by the slats while excess blocks drop out of the system.

Blocks are then pushed across a moisture sensing means, which cause a door to open, if a block's moisture content is unacceptable. Blocks with unacceptable moisture content drop out of the system and those with acceptable moisture content are pushed across the closed door. The moisture detecting means and its associated elements may be omitted.

Finally, blocks are pushed across the outfeed plate by the slats and are deposited correctly aligned and correctly orientated at precise intervals on the finger joint machine's lug chain at any lineal speed determined by the finger joint machine.

This is performed without a human operator.

INDUSTRIAL APPLICABILITY

The invention is envisaged as a complete, unmanned, automatic, infeed apparatus for a finger jointing machine, although it is applicable to other woodworking machines performing similar end matching operations It should not, however, be limited only to lumber or wood materials since it is applicable to handling any random length and width object that requires that the objects be aligned, singularized and positioned precisely on a conveyor.

While the invention has been disclosed in its preferred form, it is to be understood that the specific embodiment thereof as disclosed and illustrated herein is not to be considered in a limited sense and changes or modifications may be made without departing from the spirit of the invention.

I claim:

1. An automatic infeed apparatus for a finger joint machine to receive blocks in a random arid haphazard manner, to align and orientate the said blocks into a coherent order, to detect the moisture content of the said blocks and to reject any said blocks having an unacceptable moisture content and to dispense the said blocks with acceptable moisture content to a woodworking machine at controlled, precise intervals throughout the said woodworking machine's operating speed range and comprising:

a powered slat chain comprised of two endless, same length, powered chains exactly spaced apart and connected by a plurality of slats located at regular, equal intervals on the said chains;

a slat chain head shaft assembly, comprising a rotatable shaft and a plurality of drive sprockets bearings and a driven sprocket, which causes the said slat chain to move within the apparatus;

a plurality of slat chain idler assemblies, comprising shafts, idler sprockets and shaft collars, which support and guide the said slat chain within the apparatus;

a support structure, to which the said slat chain head shaft assembly and the said slat chain idler assemblies are attached, comprising an infeed end and an outfeed end and a plurality of columns, including height adjusting means located on a foot plate of each the said columns, a working table attached to the said columns, an upper horizontal frame attached to the said columns and an unscrambler attached to the said working table;

an intermittently operable infeed conveyor, located at the infeed end of the said support structure and supported by the said working table and lying within a loop created by the said slat chain, which receives blocks from a supply conveyor and is controlled by a block sensing means located adjacent to the said infeed conveyor's outfeed end;

the said unscrambler, adjacent to the said infeed conveyor's outfeed, which receives the said blocks from the said infeed conveyor and partially singularizes, orientates and aligns the said blocks when the said slats, located on the said slat chain, move upward through a slot in the bottom of the said unscrambler and carry the said blocks past a singularizer and beneath a rotating paddle means;

a block sensing means, located adjacent to the said unscrambler, which detects an excess number of the said blocks within the said unscrambler and thereby controls the said block sensing means located adjacent to the said infeed conveyor's outfeed end;

an unscrambler drive shaft assembly, located adjacent to the said unscrambler, rotated by the said slat chain and comprising a rotating shaft and a plurality of bearings and sprockets;

a controllable, rotating singularizer, Located adjacent to the said unscrambler's outfeed, which pushes excess blocks off the said slats and is driven by the said unscrambler drive shaft assembly;

a switch gear means, adjacent to the said unscrambler and the said singularizer, whereby power from the said unscrambler drive shaft assembly may be connected or disconnected to the said singularizer;

the rotating paddle means which causes misaligned blocks to fall down into the said unscrambler and which is located above the said unscrambler's outfeed end and linked to the said unscrambler drive shaft assembly by a sprocket and chain means;

an even ending conveyor, supported by the working table, which carries the said blocks towards one of the said spaced apart chains and which is located adjacent to the said unscrambler's outfeed end and lies transversely within the said lower horizontal frame and between the said spaced apart chains and which is driven by the said unscrambler drive shaft assembly through a gearbox and a sprocket and chain means;

the said working table further comprised of a plate extending the width of the invention and from the said even ending conveyor to an outfeed plate and further comprising an excess block drop out gap and an unacceptable block moisture drop out gap;

a plurality of slat chain wear strips supporting the said slat chains and running longitudinally beneath the said spaced apart chains from the said unscrambler to the outfeed end of the said outfeed plate adjacent to the sides of the said working table;

an over height sensing means, located upstream of the said excess block drop out gap, which causes the said slat chain to stop, if it senses any object protruding above the said blocks;

a block hold down means, located adjacent to and transversely in line with the said excess block drop out gap, that applies downward pressure against an upper face of the said blocks to prevent a free end of the said block from depressing and catching a lip of the outfeed side of the said excess block drop out gap;

one or more moisture detecting means, located adjacent to the outfeed side of the said block hold down, which detect the moisture content of the said blocks;

a door, located on the outfeed side and adjacent to the said moisture detecting means, which closes the said unacceptable block moisture drop out gap thereby allowing the said slats to push the said blocks containing acceptable moisture across the said unacceptable block moisture drop out gap and onto the outfeed plate;

a first slat sensing means, adjacent to and transversely in line with the said moisture detecting means, which enables the said moisture detecting means, if no slat is above the said moisture detecting means;

a pressure cylinder means, attached to the said door and the said working table, which is operated by a solenoid valve means and causes the said door to open and close;

a second slat sensing means, located in the said working table, which is enabled by the said moisture detecting means and, if it detects a said slat, activates the said solenoid valve means, thereby causing the said pressure cylinder to operate and open the said door to allow said blocks containing unacceptable moisture to fall through;

a third slat sensing means, located in the said working table, which is enabled by one of the first or second said slat sensing means and, if it detects a said slat, activates the said solenoid valve means, thereby causing the said pressure cylinder to operate and close the said door;

an over height sensing means, located adjacent to the outfeed side of the said door, which causes the said slat chain to stop, if it senses any object protruding above the said blocks;

the said outfeed plate comprising a plate, extending the width of the said working table and from the outfeed side of the said door to the outfeed end of the invention and adjusted, by the said height adjusting means, to lie superior to a finger joint machine's lug chain or said finger joint machine's slat chain which permits the said slats to push the said blocks over and off the said outfeed plate onto the said finger joint machine's lug chain or said finger joint machine's slat chain;

a plurality of slots cut in the said outfeed plate, if a finger joint lug chain is employed by the said finger joint machine, to accommodate the passage of the said finger joint lug chain's lugs through the said outfeed plate;

a plurality off chain carriers, located on the said upper frame, which support the said slat chain;

a plurality of slat chain wear strips attached longitudinally to an upper face of the said chain carriers and supporting the said slat chain.

2. An automatic infeed apparatus for a woodworking machine to receive blocks in a random and haphazard manner, to align and orientate the blocks into a coherent order and dispense the blocks to a woodworking machine at controlled, precise intervals throughout the woodworking machine's operating speed range, comprising:

a support structure including an infeed end, an outfeed end, a working table and several vertically extending support columns;

a powered slat conveyor supported by the support structure, the powered slat conveyor including two endless, same length, powered loops exactly spaced apart and connected by a plurality of slats located at intervals on the said loops, an upward portion of said loops being supported by the support columns, a lower portion of said loops extending across a portion of the working table;

means for driving the powered slat conveyor, an unscrambler that is associated with the support structure, the unscrambler being adapted to receive random blocks and partially singularize, orientate and align the blocks when the slats, located on the loops, move upward through a slot in a bottom of the unscrambler.

an even ending conveyor, supported by the support structure, which carries the blocks towards one of the spaced apart loops and which is located adjacent to an outfeed end of the unscrambler and lies transversely to the support structure;

the working table having an excess block drop out gap, through which excess blocks pass; and the working table including an outfeed plate extending the width of the working table and being adapted to lie superior to one of a lug chain or a slat chain of a finger joint machine which permits the slats to push the blocks over and off the outfeed plate onto one of the lug chain or the slat chain.

3. The automatic infeed apparatus as defined in claim 2, wherein there is provided a horizontal frame between an upper end of the vertically extending support columns.

4. The automatic infeed apparatus as defined in claim 2, wherein the powered slat conveyor uses spaced apart chains.

5. The automatic infeed apparatus as defined in claim 2 wherein the means for driving the powered slat conveyor includes:

a slat chain head shaft assembly, comprising a rotatable shaft and a plurality of drive sprockets, bearings and driven sprockets, which causes the slat chain to move within the apparatus;

a plurality of slat chain idler assemblies, comprising shafts and idler sprockets which support and guide the slat chain within the apparatus;

the slat chain head shaft assembly arid the slat chain idler assemblies being attached to the support structure.

6. The automatic infeed apparatus as defined in claim 5, wherein a plurality of chain carriers are provided, the plurality of chain carriers being located on the support structure, which support the slat chain.

7. The automatic infeed apparatus as defined in claim 2, wherein there is provided an infeed conveyor, located at the infeed end of the support structure and supported by the working table and lying within the loops, which receives blocks from a supply conveyor.

8. The automatic infeed apparatus as defined in claim 7, wherein the unscrambler is located adjacent to an outfeed end of the infeed conveyor.

9. The automatic infeed apparatus as defined in claim 2, wherein a controllable, singularizer is located adjacent to an outfeed end of the unscrambler, which pushes excess blocks off the slats.

10. The automatic infeed apparatus as defined in claim 2, wherein a rotating paddle means is provided which causes misaligned blocks to fall down into the unscrambler and which is located above an outfeed end of the unscrambler.

11. The automatic infeed apparatus as defined in claim 4, wherein the even ended conveyer is positioned between the spaced apart chains.

12. The automatic infeed apparatus as defined in claim 2, wherein a block hold down is located adjacent to and transversely in line with the excess block drop out gap, that applies downward pressure against an upper face of the blocks to prevent a free end of the block from depressing and catching a lip of an outfeed side of the excess block drop out gap.

13. The automatic infeed apparatus as defined in claim 2, wherein the working table is further comprised of a plate extending the width of the apparatus and from the even ending conveyor to the outfeed plate and further comprising an unacceptable block moisture drop out gap.

14. The automatic infeed apparatus as defined in claim 2, wherein means is provided to detect moisture content of the blocks and to reject any of the blocks having an unacceptable moisture content and to dispense the blocks with acceptable moisture content to a woodworking machine.

15. The automatic infeed apparatus as defined in claim 14, wherein there is provided one or more moisture detecting means which detect the moisture content of the blocks;

a first slat sensing means which enables the moisture detecting means; and means located adjacent to the working table, which is enabled by the moisture detecting means, if it detects blocks with unacceptable moisture, to direct the blocks containing unacceptable moisture to the unacceptable block moisture drop out gap.

16. The automatic infeed apparatus as defined in claim 2, wherein a plurality of slots are cut in the outfeed plate such that if a finger joint lug chain is employed by the finger joint machine, the plurality of slots accommodate the passage of the finger joint lug chain's lugs through the outfeed plate.

* * * * *